UNITED STATES PATENT OFFICE.

LUDWIG THEODOR MOESER AND WILHELM ERNST EIDMANN, OF GIESSEN, GERMANY, ASSIGNORS TO FIRM OF CHEMISCHE FABRIK GRIESHEIM ELECTRON, OF FRANKFORT-ON-THE-MAIN, GERMANY.

PRODUCTION OF THE METALS OF THE ALKALIES.

SPECIFICATION forming part of Letters Patent No. 710,493, dated October 7, 1902.

Application filed March 10, 1902. Serial No. 97,637. (No specimens.)

*To all whom it may concern:*

Be it known that we, LUDWIG THEODOR MOESER and WILHELM ERNST EIDMANN, subjects of the Emperor of Germany, and residents of Giessen, Germany, have invented certain new and useful Improvements in the Production of the Metals of the Alkalies, of which the following is a specification.

The object of this invention is the extraction of the metals of the alkalies in a cheap and simple manner; and it consists in using as raw material the fluorin compounds of the alkalies (which compounds are easy to obtain) and causing them to react on carbids, and more especially calcium carbid. The alkali fluorid acts readily upon the calcium carbid at a comparatively low temperature to effect an intramolecular change therein, and by slightly raising the temperature the alkali carbid is readily decomposed and the alkali metal can be distilled off without difficulty. If in order to avoid the burning of the reaction product nitrogen or ammonia be passed over it, one part of the alkali carbid is converted into the cyanid, which can be extracted from the residue by lixiviation.

The advantages of this process over others for producing the same final products are that the initial raw materials are easily and cheaply obtained; it can be carried out in a single vessel without requiring an intermediate separation of the by-product. The reaction takes place quickly and smoothly and is very economical.

The invention may be carried out in practice as follows: Take a mixture consisting of sixty-four kilograms of calcium carbid and one hundred and sixteen kilograms of potassium fluorid and heat it to a red heat in a retort from which the air has been previously expelled, so that there is no oxygen left in the retort. The reaction immediately commences when the temperature of red heat is reached, the intermediate reactions (formation of calcium fluorid and alkali carbid and decomposition of the latter into the alkali metal and carbon) taking place so rapidly that the vapors of the metal pass at once into the receiver. The oxygen may be removed from the retort by exhausting the air, as before mentioned, or by the evaporation of volatile hydrocarbons added to the reaction mass, or by introducing nitrogen or ammonia gas into the retort. In the latter case alkali cyanid is found in the residue of the distillation. As soon as the vapors of the metals cease to be evolved the reaction is at an end. In lieu of the alkali fluorid alkali silico-fluorid or cryolite and other double fluorid may be used. There is then formed in addition to the alkali metal silicon carbid or aluminium carbid, which is found in the residue of the distillation. Under certain circumstances the aforesaid double fluorids have advantages on account of their being easily procured at a low cost. The process is the same as previously described, practically-equivalent quantities of the raw materials being used.

Hitherto it has not been possible to manufacture alkali metals, and especially potassium, in such a cheap manner as to render the process commercially practicable, whereas by the process according to this invention it is possible to manufacture this metal at a price which renders it available by manufacturers, and this invention therefore constitutes an important industrial improvement, as the metal is capable of extensive application.

It is understood that this process does not refer to aluminium, but to the metals of the alkalies.

We claim—

The herein-described process of producing the metals of alkalies which consists in heating a mixture of calcium carbid and alkali fluorid to a red heat in the absence of oxygen.

In testimony whereof we have signed our names to this specification in the presence of two subscribing witnesses.

LUDWIG THEODOR MOESER.
WILHELM ERNST EIDMANN.

Witnesses:
FRANZ HASSLACHER,
MICHAEL VOLK.